Patented May 29, 1951

2,554,947

UNITED STATES PATENT OFFICE 2,554,947

2-n-BUTOXYETHYL ESTER OF β,β-DIMETHYLACRYLIC ACID

Bernhard Joos, Schaffhausen, Switzerland, assignor to Defensor, Zurich, Switzerland, a Swiss corporation No Drawing. Application April 9, 1947, Serial No. 740,464. In Switzerland February 4, 1947

1 Claim. (Cl. 260—486)

Dialkylates, substituted tetralols, substituted glycidic acid esters, dioxane derivatives and hydroamatic compounds have all been tested as insecticides, but none of the substances meets the requirements respecting efficiency, stability, odor and freedom from delecterious properties. (Ind. & Eng. Chem., March 46, p. 5; Naval Medical Research Institute, National Naval Center, September 1945, Res. Project X, 168, Report 8; Lancet, 1946, 6425, p. 570; Am. Chem. Soc. 68, p. 2112; Journal American Pharmacential Association Practical Edition 2, 202—205.)

The invention relates to a series of new organic compounds according to the general formula:

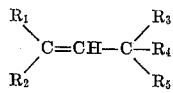

in which (a) $R_1$ and $R_2$ stand for organic radicals (for example alkyl- or aralkyl-groups) having in place of $R_3$ and $R_4$ a single oxygen atom in the case that $R_5$ denotes either of the following: an alkyl group of more than 2 carbon atoms, or an alkenoxy, alkinoxy, oxalkoxy, alkoxyalkoxy, cyclo-alkoxy, aryloxy, alkylamino, dialkylamino, aralkylamino or aryl group; or in which (b) $R_1$ and $R_2$ stand for organic radicals (for example alkyl or aralkyl groups) and $R_3$ and $R_4$ denote alcohol radicals (for example alkoxy or aralkoxy groups) in case that $R_5$ stands for a hydrogen atom, an alkyl, or an aryl group; or (c) in which $R_1$ and $R_2$ stand for organic radicals (for example alkyl or aralkyl groups) in case that $R_3$ and $R_4$ stand for hydrogen atoms and $R_5$ is an acyloxy group.

Investigations of such compounds have proved their high efficiency as insecticides and parasiticides. Esters according to the following formula were found to be particularly potent insecticides:

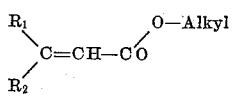

when the alkyl-group carbon chain of the ester group contains one or more oxygen atoms.

The new compounds according to the general formula and invention can be obtained by the application of known methods. The invention also relates to a process for the manufacture of esters according to the general formula and furthermore to such acid amides, thereby characterized that a starting material of the formula:

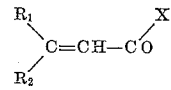

in which $R_1$ and $R_2$ stand for organic radicals, such as alkyl or aralkyl groups, and X denotes a readily replaceable substituent (for example the OH group, or a halogen atom), is (a) reacted with an alcohol of the formula HO.Y, in which Y stands for an alkyl group with at least 3 carbon atoms, or either an alkenyl, alkinyl, oxyalkyl, alkoxyalkyl, cycloalkyl, or aryl group, to form the corresponding ester, or (b) reacted with an amine (for example a primary or secondary aliphatic amine or a cyclic secondary amine) to supply the corresponding acid amide; or (c) wherein a compound according to the formula:

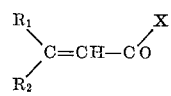

in which $R_1$ stands for an organic radical (for example an alkyl or aryl group), $R_2$ for an organic radical with more than one carbon atom and whereby $R_1$ and $R_2$ are interconnected, and X stands for a readily exchangeable substituent, is esterified by an alcohol of the formula HO.Y, in which Y stands for an organic radical.

Such esters can be obtained also by the condensation of a ketone with the ester of a monohalogenated acetic acid, for example the isoamyl, cyclohexyl, 2-2-2 trichloro-ethyl, β-oxyethyl, or β-N butoxyl-ethyl-ester.

A further group of compounds according to the invention may be obtained when compound of the formula:

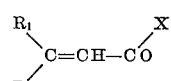

in which $R_1$ and $R_2$ stand for organic radicals (for example alkyl or aralkyl groups) and X is a readily exchangeable substituent such as the OH group or a halogen atom, is reacted with an aromatic compound such as benzene, resorcinol, etc. in the presence of a condensing agent (for example zinc chloride or aluminium chloride).

Further insecticides according to the general formula can be obtained when a compound of the formula:

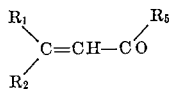

in which R₁ and R₂ stand for the radicals aforementioned and R₅ denotes a hydrogen atom, an alkyl or aralkyl group, is reacted with an alcohol, for example with hydrobenzoine or a pinacone, to obtain as a condensation product the corresponding ketale.

Another group of compounds according to the general formula can be obtained by reacting a compound according to either of the two following formulae:

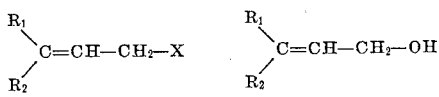

in which R₁ and R₂ stand for organic residues (for example an alkyl or aralkyl group) and X denotes a readily exchangeable substituent such as a halogen atom, with a compound embodying the radical of an organic acid, for example a salt, a benzoic acid ester, or a halogenic benzoic acid-ester of β,β dimethyl-acrylic acid.

The invention furthermore relates to a method for combatting pests such as midges, flies, gadflies, lice, fleas, bugs, itch-mites, moths, etc., thereby characterized that at least one compound according to the following general formula is employed

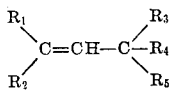

in which R₁ and R₂ stand for organic radicals, for example hydrocarbon radicals such as alkyl or aralkyl groups, and in which (a) R₃ and R₄ are replaced by a single oxygen atom in case R₅ stands for an organic radical, for example an alkoxy, alkenoxy, alkinoxy, oxyalkoxy, alkoxy-alkoxy, cyclo-alkoxy, aryloxy, alkylamino, dialkylamino, aralkylamino, alkyl, or aryl group, or in which (b) R₃ and R₄ denote alcohol radicals, for example alkoxy or aralkoxy radicals, in the case that R₅ denotes a hydrogen atom, an alkyl or aryl group, or in which (c) R₃ and R₄ are hydrogen atoms and R₅ is an acyloxy group.

The utilization of the compounds according to the invention is based on the discovery that they possess in high degree toxic properties for insect pests, but are harmless to higher animals and to humans. It has proved possible to show that the new compounds are putrefactive oxidizing catalysts. By reason of their very favourable distributing coefficients and their inertia towards decomposition these substances penetrate into the nerve tissue of the noxious insects, exert a paralytic effect and lead to a decomposition of nerve substance, whereby the pests are rapidly destroyed. Some odoriferous insecticides according to the general formula can be detected by insects and in consequence they avoid such substances. Persons, places and objects treated with such compounds, for example: rooms, stables, clothes, beds, furniture, animal or human bodies etc., therefore exert a repellent action on insect pests. Furthermore numerous compounds according to the invention are distinguished by a pleasant odor and for such reason can be employed as prophylactic and therapeutic perfumes.

The substances according to the invention are utilized by an application in a known manner, by spraying and distributing in the form of powders, emulsions, suspensions, or solutions; they can be applied to the skin as dusting powders, ointments, lotions, etc.

The terms "alkyl" and "aryl" shall be understood to cover not only the non-substituted hydrocarbon radicals but also such residues bearing substituents, as for example: aryl, hydroxyl, alkoxy-groups and halogen atoms.

*Example 1.*—A solution of 100 gms. β,β dimethyl-acrylic acid chloride in 500 cc. benzol is diluted drop by drop with a mixture of 70 gms. n. butanol, 70 cc. pyridin and 350 cc. benzol. After the violent reaction has subsided the reaction mixture is heated on the steam-bath. The cooled mixture is separated from the precipitated pyridin hydrochloride and the filter is consecutively washed with dilute hydrochloric acid, soda solution, and water. The filtrate is dried, the benzol evaporated and the residue mainly consisting of the β,β dimethyl-acrylic-acid-n-butyl-ester is vacuum distilled and the new ester obtained in form of a colorless liquid with a boiling point of 97° C. under 25 mm. pressure. Yield 125 gms.

*Example 2.*—A solution of 100 gms. β,β dimethyl-acrylic-acid chloride in 500 cc. benzol is added slowly to a mixture of 80 gms. isoamyl-alcohol, 70 cc. pyridin and 350 cc. benzol. As soon as the violent reaction has subsided the reaction mixture is heated for about 30 minutes on the water bath. After cooling the pyridin hydrochloride is filtered off, and the filtrate washed with dilute hydrochloric acid, with soda solution, and with water, and finally the benzol distilled off. By fractionating the residue the β,β dimethyl-acrylic acid isoamylester is obtained in a quantity of 120 gms. as a colorless oil with a boiling point between 105° and 107° C. at a pressure of 22 mm.

*Example 3.*—To a solution of 100 gms. β,β dimethyl-acrylic acid in 100 gms. cyclohexanol and 500 cc. benzol 20 gms. p. toluene-sulfonic acid is added and the mixture slowly distilled through a bulb-tube for driving off benzol and water, formed by the reaction. After the water has been completely removed the reaction mixture is neutralized with soda solution and washed, then the remainder of the benzol is distilled off and the residue fractionated under vacuum. The β,β dimethyl-acrylic acid cyclo-hexylester thus obtained in a yield of 130 gms. has a boiling point of 100° C. at a pressure of 0.15 mm.

*Example 4.*—A solution of 100 gms. β,β dimethyl acrylic acid chloride in 500 cc. benzol is reacted with 95 gms. cyclohexanol in 350 cc. benzol and 70 cc. pyridin. The reaction mixture is worked up as described in Example 1. The β,β dimethyl acrylic acid cyclo-hexylester is obtained in a yield of 130 gms.

*Example 5.*—A solution of 100 gms. β,β dimethyl-acrylic acid chloride in 50 cc. benzol is added cautiously to a mixture of 50 gms. allyl-alcohol, 70 cc. pyridin and 350 cc. benzol and the reaction mixture worked up in the manner described in the Example 1. The β,β dimethyl acrylic acid-allylester obtained in a yield of 125 gms. has a boiling point of 82°–83° C. at a pressure of 27 mm.

*Example 6.*—A solution of 100 gms. β,β dimethyl-acrylic acid chloride in 500 cc. benzol is reacted with 100 gms. benzyl-alcohol in 70 cc. pyridine and 350 cc. benzol. The reaction mixture is worked up as described in Example 1. The β,β dimethyl-acrylic-acid-benzylester obtained in a yield of 135 gms. is a colorless liquid with a boiling point of 224° to 235° C. at a pressure of 0.09 mm.

*Example 7.*—Into a cooled solution of 100 gms. dry β,β dimethyl-acrylic acid in 200 cc. acetone 50 gms. ethylene oxide are introduced. After letting the reaction mixture stand for one day air is passed through the reaction mixture by a capillary tube at a temperature of 20° C. during one hour. The mixture is neutralized with a soda solution, the acetone distilled off, and the residual liquid fractionated in vacuum. The obtained β,β dimethyl-acrylic acid β oxyethylester is a colorless liquid with a boiling point of 85°–88° C. at a pressure of 12 mm.

*Example 8.*—A solution of 100 gms. β,β dimethyl-acrylic-acid chloride in 500 cc. benzol is mixed drop by drop with a mixture of 2-2-2 trichloro-ethanol, 70 cc. pyridin and 350 cc. benzol. The reaction mixture is worked up as described in Example 1. The obtained β,β dimethyl-acrylic-acid-βββ trichloro-ethylester is a colorless liquid with a boiling point of 78°–86° C. at a pressure of 0.2 mm. Yield, 160 gms.

*Example 9.*—A solution of 100 gms. β,β dimethyl-acrylic acid-chloride in 500 cc. benzol is reacted with a mixture of 40 gms. glycerol-α monochlorhydrine, 75 cc. pyridin and 350 cc. benzol. The reaction mixture is worked up as described in Example 1. The 1 chloro-2-3 propylene-bis 3-3 β,β dimethyl acrylate is obtained as a reddish liquid with a boiling point of 140° C. at a pressure of 0.18 mm. Yield, 92 gms.

*Example 10.*—A solution of 100 gms. β,β dimethyl-acrylic-acid chloride in 500 cc. benzol is added drop by drop to a solution of 160 gms. n-butyl-2 oxy-ethylether in 70 cc. pyridin and 350 cc. benzol. The reaction mixture worked up as described in Example 1, supplies 155 gms. of β,β dimethyl-acrylic acid-β'-butoxy-ethylester as a colorless oil with a boiling point of 120°–125° C. at a pressure of 0.3 mm.

*Example 11.*—A mixture consisting of 150 gms. N·butoxy-ethoxy-ethanol of the formula

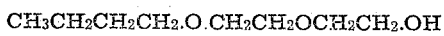

CH₃CH₂CH₂CH₂.O.CH₂CH₂OCH₂CH₂.OH 70 cc. pyridin and 350 cc. benzol are added drop by drop to a solution of 100 gms. β,β dimethyl acrylic-acid chloride in 500 cc. benzol. The reaction mixture is heated for 3 minutes on the water bath, and after cooling the precipitated pyridin hydrochloride is filtered off. The benzol solution is firstly washed with dilute acid, then with dilute alkali liquor, and finally with water. After removing the benzol by distillation the residue is vacuum distilled. The β,β dimethyl-acrylic acid-β-(n-butoxy-ethoxy)-ethylester is obtained as a yellowish oil with a boiling point of 235°–240° C. at a pressure of 1.6 mm. Yield, 91 gms.

*Example 12.*—In a dry round-bottomed flask 80 gms. of zinc filings are covered with a mixture of 150 gms. chloro-acetic acid-n-butyl-ester and 130 gms. phenylacetone. The mixture remains standing for one week in the flask supplied with a reflux condenser, then it is heated for one hour. To the reaction mixture are added 500 cc. water, sufficient 2 n sulfuric acid for obtaining an acid reaction, and the separated oil fractionated. The obtained benzyl-crotonic acid-n-butylester is a colorless liquid with a boiling point between 129°–139° C. at a pressure of 9 mm.

*Example 13.*—A mixture of 90 cc. morpholine and 100 cc. pyridin is gradually added to a solution of 130 gms. β,β dimethyl-acrylic acid chloride in 200 cc. benzol (for obtaining a controlled reaction). After the reaction is terminated an equal quantity of water is added to the reaction mixture and the benzol layer separated from the water. The benzol solution is consecutively washed with dilute hydrochloric acid, sodium bicarbonate solution, and water. The benzol is distilled off and the residue distilled in a high vacuum. The obtained β,β dimethyl-acrylic acid-morpholide is a colorless liquid with a boiling point of 89°–92° C. at a pressure of 0.5 mm.

*Example 14.*—To a solution of 100 gms. β,β dimethyl-acrylic-acid chloride in 1000 cc. benzol are added in portions 150 gms. aluminium chloride. The reaction mixture is heated on the water bath for 3 hours, then the benzol is distilled off, and the residue poured onto 600 gms. ice. After the addition of 20 cc. concentrated hydrochloric acid the remainder of the benzol is driven off by passing steam through the reaction mixture and the residuum taken up with ether. The either solution is separated from water, the ether distilled off, and the residue distilled in vacuo. The obtained β,β dimethyl-acrylophenone is a colorless liquid with a boiling point between 109°–111° C. at a pressure of 9 mm.

*Example 15.*—To a warm solution of 100 gms. zinc chloride in 100 gms. β,β dimethyl-acrylic acid are added 150 gms. resorcinol. The reaction mixture is heated on a sand-bath to the boil (split off water). The cooled melt is treated with 3 litres of water, whereby the resdimethyl-acrylophenone of the formula

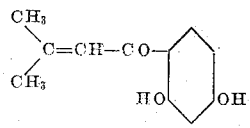

is precipitate. This product is vacuum distilled and obtained as a light yellow oily liquid with a boiling point of 185°–187° C. at a pressure of 9 mm. Yield, 145 gms.

*Example 16.*—A mixture of 100 gms. mesityl-oxide, 200 gms. hydrobenzoine, 3 gms. toluene sulfonic acid, and 200 gms. benzol is submitted to an azeotropic distillation till the splitting off of water has subsided. The residue is taken up with hot benzinum and the solution decolorized by treatment with animal charcoal. On cooling the cyclic ketale crystallizes and is purified by recrystallization from benzinum. The melting point of the substance is 83° C. and its formula:

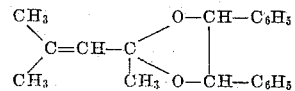

*Example 17.*—A mixture of 100 gms. mesityl-oxide, 120 gms. pinacone, 3 gms. p. toluene sulfonic acid and 300 cc. toluene is submitted to an azeotropic distillation till the splitting off of water subsides (about 1¼ hours). The residue is taken up with 500 cc. of hot benzinum, the solution decolorized with animal charcoal, washed with soda solution, and dried. The solvent is evaporated and the residue vacuum distilled. The obtained pinacone-ketale of the mesityloxide is a colorless liquid with a boiling point of 41°–43° C. at a pressure of 9 mm.

*Example 18.*—A mixture of 120 gms. acetophenone-pinacone, 50 gms. mesityloxide, 3 gms. p- toluene-sulfonic acid and 300 cc. toluene is submitted to an azeotropic distillation. The residue is dissolved in 300 cc. hot benzinum and the solution decolorized with animal charcoal. On cooling the cyclic acetophenone-pinacone-ketal of mesityloxide crystallizes in colourless needles. Melting point 73°–75° C.

*Example 19.*—A solution of 130 gms. perhydroacetophenone-pinacone, 50 gms. mesityloxide and 3 gms. p-toluene-sulfonic acid in 400 cc. toluene are submitted to an azeotropic distillation. As soon as no further quantity of water distills over the toluene is removed by vacuum distillation and the residue taken up in 300 cc. hot benzinum. On cooling the perhydroacetophenone-ketale of the mesityloxide is obtained in colorless needles with a melting point of 71°–72° C.

*Example 20.*—A mixture of 80 gms. dimethyl-allyl-alcohol, 70 cc. pyridin and 350 cc. benzol is added drop by drop to a solution of 100 gms. β,β dimethyl-acrylic acid chloride in 500 cc. benzol. The reaction mixture is heated for 30 minutes on the water-bath and subsequently cooled. The precipitated pyridin hydrochloride is filtered off, and the benzol solution consecutively washed with dilute hydrochloric acid, diluted soda solution and water, and dried. After removing the benzol by evaporation the residue is fractionated under vacuum. The obtained β,β dimethyl-acrylic acid γγ' dimethylallylester is a colorless oil with a boiling point of 99°–100° C. at a pressure of 12 mm.

*Example 21.*—A mixture of 140 gms. geraniol, 70 cc. anhydrous pyridin and 350 cc. benzol is added drop by drop to a solution of 100 gms. β,β dimethyl-acrylic acid chloride in 500 cc. anhydrous benzol. The precipitated pyridin hydrochloride is filtered off and washed out with benzol. The filtrate is consecutively washed with dilute hydrochloric acid, soda solution and water, then dried and evaporated. The residue mainly consisting of β,β dimethyl-acrylic-acid-geranylester is vacuum distilled. The new ester has a boiling point of 147°–148° C. in a high vacuum and is a colorless liquid with a pleasant odor.

Analogous to the Examples 1 to 11 it is possible to obtain:

From a compound containing the radical of the β benzyl-β methyl-acrylic-acid and n. butanol the β benzyl-crotonic-acid-n-butylester.

From a compound containing the radical of the β benzyl β ethyl-acrylic acid and isoamyl alcohol the β benzyl β ethyl-acrylic acid isoamylester.

From a compound containing the radical of the β benzyl-β n-propyl-acrylic acid and cyclohexanol the β benzyl β n-propyl-acrylic acid cyclohexylester.

From a compound containing the radical of the β,β diethyl-acrylic acid and allyl-alcohol the β,β diethyl-acrylic acid-allylester.

From a compound containing the radical of the cyclo-hexylidene acetic acid and geraniol the cyclohexylidine-acetic acid geranyl-ester.

From a compound containing the radical of the 4 methyl-cyclohexylidene acetic acid and benzyl-alcohol the 4 methyl-cyclohexylidene-acetic acid benzylester.

From cyclopentylidene acetic acid and ethylene oxide the cyclopentylidene acetic acid β-oxyethyl-ester.

From a compound containing the radical of the β ethyl-β-n-propyl-acrylic acid and 2-2-2 trichloroethanol the β ethyl β n-propyl acrylic acid 2-2-2-trichlor-ethylester.

From a compound containing the radical of the β methyl β isoamyl-acrylic acid and β-n-butoxyethanol the β methyl-β isoamyl-acrylic acid β n-butoxyethylester.

Furthermore analogous to Example 13:

From a compound containing the radical of the cyclopentylidene acetic acid and morpholine the cyclopentylidene-acetic-acid morpholide.

Furthermore analogous to Example 14:

From a compound containing the radical of the cyclohexylidene acetic acid and benzene the cyclohexylidene-acetophenone.

Furthermore analogous to Example 15:

From β benzyl-crotonic acid and resorcinol the phenyl-isopropylidene-resacetophenone.

Furthermore analogous to the Examples 16 to 19:

From phenylisopropylidene-acetone and hydrobenzoine the cyclic cyclo-pentylidene-acetone-perhydrobenzoine-ketal.

From cyclopentylidene-acetone and perhydrobenzoine the cyclic compound cyclopentylidene-acetone-perhydrobenzoine-ketal.

Furthermore analogous to Examples 20 and 21:

From γ methyl γ isoamyl-allyl-alcohol and phenyl acetic acid the γ methyl γ isoamyl-allyl-phenylacetate.

From linalool and β,β dimethyl-acrylic acid halogenide the linalyl β,β dimethylacrylate.

I claim:

The chemical compound of the formula

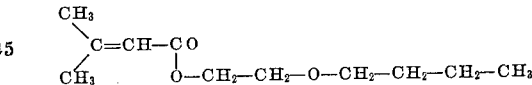

BERNHARD JOOS.

REFERENCES CITED

The following references are of record in the file of this patent:

UNITED STATES PATENTS

| Number | Name | Date |
| --- | --- | --- |
| 2,187,694 | Slagh | Jan. 16, 1940 |

OTHER REFERENCES

Auwers: Annalen 432, pp. 71–72 (1923).
Philippi: Monatshefte 51, page 277 (1929).
Chemical Abstracts 36, 1308[2] (1942).
Chemical Abstracts 40, 1867[8] (1946)